(12) United States Patent
Mottier

(10) Patent No.: US 7,428,248 B2
(45) Date of Patent: Sep. 23, 2008

(54) CODE ALLOCATION METHOD IN AN MC-CDMA TELECOMMUNICATION SYSTEM

(75) Inventor: David Mottier, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1556 days.

(21) Appl. No.: 10/316,069

(22) Filed: Dec. 11, 2002

(65) Prior Publication Data

US 2003/0112787 A1    Jun. 19, 2003

(30) Foreign Application Priority Data

Dec. 19, 2001 (EP) .................................. 01130168

(51) Int. Cl.
*H04J 1/16* (2006.01)
*H04Q 7/00* (2006.01)

(52) U.S. Cl. ................ 370/477; 370/252; 370/328; 375/220; 375/130

(58) Field of Classification Search ................ 370/441, 370/342, 535, 252, 477, 329, 328; 375/220–222, 375/145, 260, 316, 130, 141
See application file for complete search history.

(56) References Cited

U.S. PATENT DOCUMENTS

2003/0103445 A1* 6/2003 Steer et al. .................. 370/208
2003/0169722 A1* 9/2003 Petrus et al. ................ 370/347

* cited by examiner

*Primary Examiner*—John Pezzlo
(74) *Attorney, Agent, or Firm*—Oblon, Spivak, McClelland, Maier & Neustadt, P.C.

(57) ABSTRACT

A object of the present invention is to decrease or avoid the distortion of an MC-CDMA signal transmitted over a reverse link channel for a given amplifier efficiency.

The present invention concerns a code allocation method for a mobile telecommunication system. According to the invention, for each of a plurality of available spreading codes or available combinations of spreading codes a value of a first variable ($PAPR_k$) characteristic of the dynamic range of a modulated signal ($S_k$) is determined, and for each of a plurality of users a value of a second variable ($\alpha_k$) characteristic of the propagation loss incurred over the transmission channel of the user is determined. A spreading code or combination of spreading codes producing a low dynamic range is allocated to said user if the propagation loss over its transmission channel is high.

12 Claims, 3 Drawing Sheets

CODE ALLOCATION METHOD IN AN MC-CDMA TELECOMMUNICATION SYSTEM

BACKGROUND OF THE INVENTION

1. Field of the Invention

The present invention relates to a method for allocating a code to a reverse link in a multi-carrier code division multiple access system. The present invention relates in particular to a method for allocating a scrambling/spreading code to such a reverse link.

2. Description of the Related Art

In recent years, Multi-Carrier Code Division Multiple Access (MC-CDMA) has been receiving widespread interest for wireless broadband multimedia applications. Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike DS-CDMA (Direct Spread Code Division Multiple Access), in which the signal of each user is multiplied in the time domain in order to spread its frequency spectrum, the signature here multiplies the signal in the frequency domain, each element of the signature multiplying the signal of a different sub-carrier.

MC-CDMA combines the advantageous features of CDMA and OFDM, i.e. high spectral efficiency, multiple access capabilities, robustness in presence of frequency selective channels, high flexibility, narrow-band interference rejection, simple one-tap equalisation, etc.

However MC-CDMA presents a significant drawback which is due to the multi-carrier modulation. Indeed, as shown below, an MC-CDMA signal consists in a sum of modulated sub-carriers which may result in a high dynamic range.

More specifically, FIG. 1 illustrates the structure of an MC-CDMA transmitter for a given user k. We consider here a reverse link, i.e. we suppose that the transmitter is located in the mobile terminal of the user. Let $d^{(k)}(n)$ be the symbol to be transmitted from user k at time nT to the base station, where $d^{(k)}(n)$ belongs to the modulation alphabet. The symbol $d^{(k)}(n)$ is first multiplied at 110 by the product of a spreading sequence, denoted $c^{(k)}(t)$, and a scrambling sequence specific to the user and denoted $\sigma^{(k)}(t)$. The spreading sequence consists of N "chips", each "chip" being of duration $T_c$, the total duration of the spreading sequence corresponding to a symbol period T. Without loss of generality, we assume otherwise specified in the following that a single spreading sequence is allocated to the user. In general, a user may be allocated one or a plurality of orthogonal spreading sequences, according to the data rate required. In order to mitigate cellular interference (inter-cell interference and intra-cell interference), the spreading/scrambling sequences allocated to different users are preferably chosen orthogonal.

The results of the multiplication of the symbol $d^{(k)}(n)$ by the elements of the product sequence are multiplexed over a subset of frequencies of an OFDM multiplex. In general the number N of frequencies of said subset is a sub-multiple of the number L of frequencies of the OFDM multiplex. We denote $\Omega_k$ the subset of $\{0, \ldots, L-1\}$ indexing the frequencies used by user k, $c_l^{(k)}$, $l \in \Omega_k$ the values of the corresponding spreading sequence elements $\sigma_l^{(k)}$, $l \in \Omega_k$ the values of the scrambling sequence elements. The block of symbols multiplexed in 120 is then subjected to an inverse fast Fourier transformation (IFFT) in the module 130. In order to prevent intersymbol interference, a guard interval of length typically greater than the duration of the impulse response of the transmission channel, is added to the MC-CDMA symbol. This is achieved in practice by adding a prefix (denoted Δ) identical to the end of the said symbol. After being serialised in the parallel to serial converter 140, the MC-CDMA symbols are amplified in amplifier 150 in order to be transmitted over the reverse link transmission channel. The MC-CDMA method can therefore be analysed into a spreading in the spectral domain (before IFFT) followed by an OFDM modulation.

The signal $S_k(t)$ at time t which is supplied to the amplifier before being transmitted over the reverse link transmission channel can therefore be written, if we omit the prefix:

$$S_k(t) = d^{(k)}(n) \sum_{l \in \Omega_l} c_l^{(k)} \sigma_l^{(k)} \exp(j2\pi f_l t) \text{ for } nT \leq t \leq (n+1)T \quad (1)$$

where $f_l$, $l=0, \ldots, L-1$ are the frequencies of the OFDM multiplex.

The dynamic range of the MC-CDMA signal $S_k(t)$ is estimated by the so-called Peak to Average Power Ratio (PAPR) expressed by:

$$PAPR(S_k) = \frac{\max_{T_m} |S_k(t)|^2}{\frac{1}{T_m} \int_0^{T_m} |S_k(t)|^2 dt} \quad (2)$$

where $T_m$ is the time window over which the MC-CDMA signal is observed. Equivalently, the dynamic range of the MC-CDMA signal is expressed by the so-called Crest Factor (CF), simply defined as:

$$CF(S_k) = \sqrt{PAPR(S_k)} \quad (3)$$

An MC-CDMA signal of large PAPR is particularly sensitive to non-linearities of the output amplifier, also referred to as High Power Amplifier (HPA). Indeed, above a given signal amplitude, the HPA enters a saturation zone and the amplified signal is significantly distorted. The level of distortion of the amplified signal $A_k(t)$ is expressed by the so-called Output Back-Off (OBO):

$$OBO_k = \frac{P_{sat}}{E(|A_k(t)|^2)} \quad (4)$$

where $E(|A_k(t)|^2)$ is the mean power of the amplified signal and $P_{sat} = A_{sat}^2$ represents the saturation power of the amplifier where $A_{sat}$ is the amplitude saturation threshold. Equivalently, the level of distortion can be assessed at the input of the amplifier by the so-called Input Back-Off (IBO):

$$IBO_k = \frac{E(|S_k(t)|^2)}{P_{sat}} \quad (4')$$

$$S_k(t) = \sum_{i=1}^{I_k} d^{(k)}(n+i) \sum_{l \in \Omega_{k,i}} c_l^{(k,i)} \sigma_l^{(k)} \exp(j2\pi f_l t) \text{ for } nT \leq t \leq (n+1)T \quad (5)$$

where $E(|S_k(t)|^2)$ is the mean power of the input signal.

The characteristics of an HPA amplifier is shown in FIG. 2 where I(t) and O(t) respectively denotes a signal amplitude at the input and the output of the amplifier. An example of MC-CDMA signal $S_k(t)$ is also represented at the input of the amplifier. It should be noted that, by decreasing the output back-off, the operating point of the amplifier is shifted towards saturation and for a given OBO threshold non-linear distortion appears. The lower the output back-off, the higher the distortion but also the higher the amplifier efficiency. The output back-off has therefore to be adjusted to an optimal value in order to obtain the best efficiency for a given level of distortion.

SUMMARY OF THE INVENTION

A first object of the present invention is to decrease or avoid the distortion of an MC-CDMA signal transmitted over a reverse link channel for a given amplifier efficiency. A second object of the present invention is to increase the amplifier efficiency for a given distortion level of said MC-CDMA signal.

The basic idea underlying the invention is to allocate a code to a user by taking into account, on the one hand, the signal attenuation over the uplink channel and, on the other hand, the different PAPRs relative to the available codes.

DESCRIPTION OF THE PREFERRED EMBODIMENTS

We refer back again to the context of an MC-CDMA telecommunication system and we assume that each user $k=1,\ldots,K$ can be allocated one or a plurality $I_k$ of spreading codes $c^{(k,i)}$, $i=1,\ldots,I_k$ where $c^{(k,i)}$ is the sequence represented by $c_l^{(k,i)}$, $l \in \Omega_{k,i}$ and $\Omega_{k,i}$ the subset of carriers of the OFDM multiplex which is used by the spreading code $c^{(k,i)}$. In general, the subsets $\Omega_{k,i}$ relative to a given user are chosen identical, that is $\Omega_{k,i}=\Omega_k$. In such instance, the spreading sequences $c_l^{(k,i)}$, $i=1,\ldots,I_k$ are chosen orthogonal. The subsets may also be chosen disjoint, typically as interleaved subsets of $\{0,\ldots,L-1\}$. For instance, if two spreading $c^{(k,1)}$ and $c^{(k,2)}$ are used for user k, the first subset $\Omega_{k,1}$ may correspond to the odd values of l and the second subset $\Omega_{k,2}$ to the even values. In the latter case, the spreading sequences need not be orthogonal since they are frequency multiplexed.

Given $I_k$ consecutive symbols $d^{(k)}(n), d^{(k)}(n+1), \ldots, d^{(k)}(n+I_k-1)$ having to be transmitted by user k, the MC-CDMA signal carrying these symbols can be expressed, similar to (1):

As already seen above, the dynamic range of $S_k(t)$ can be estimated by its PAPR. The value $PAPR(S_k)$ depends among others upon the spreading codes $c^{(k,i)}$ and the scrambling code $\sigma^{(k)}$ allocated to the user.

In an uplink MC-CDMA telecommunication system, a base station or a plurality of neighbouring base stations are allocated a set of spreading codes. The base station allocates to each user k within the cell, one or a plurality of spreading codes (according to the data rate required) and one scrambling code.

Figure 1:
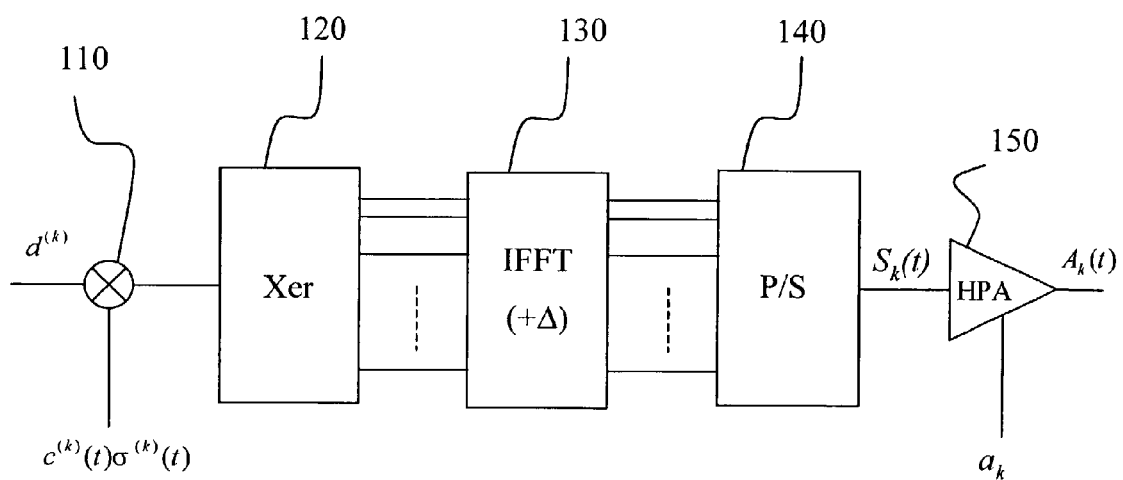
FIG. 1 depicts schematically the structure of an MC-CDMA transmitter known from the state of the art.
Figure 2:
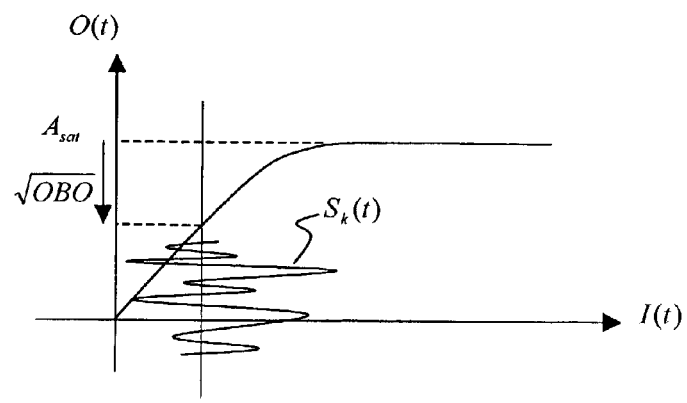
FIG. 2 depicts schematically the amplitude characteristics of a High Power Amplifier.
Figure 3:
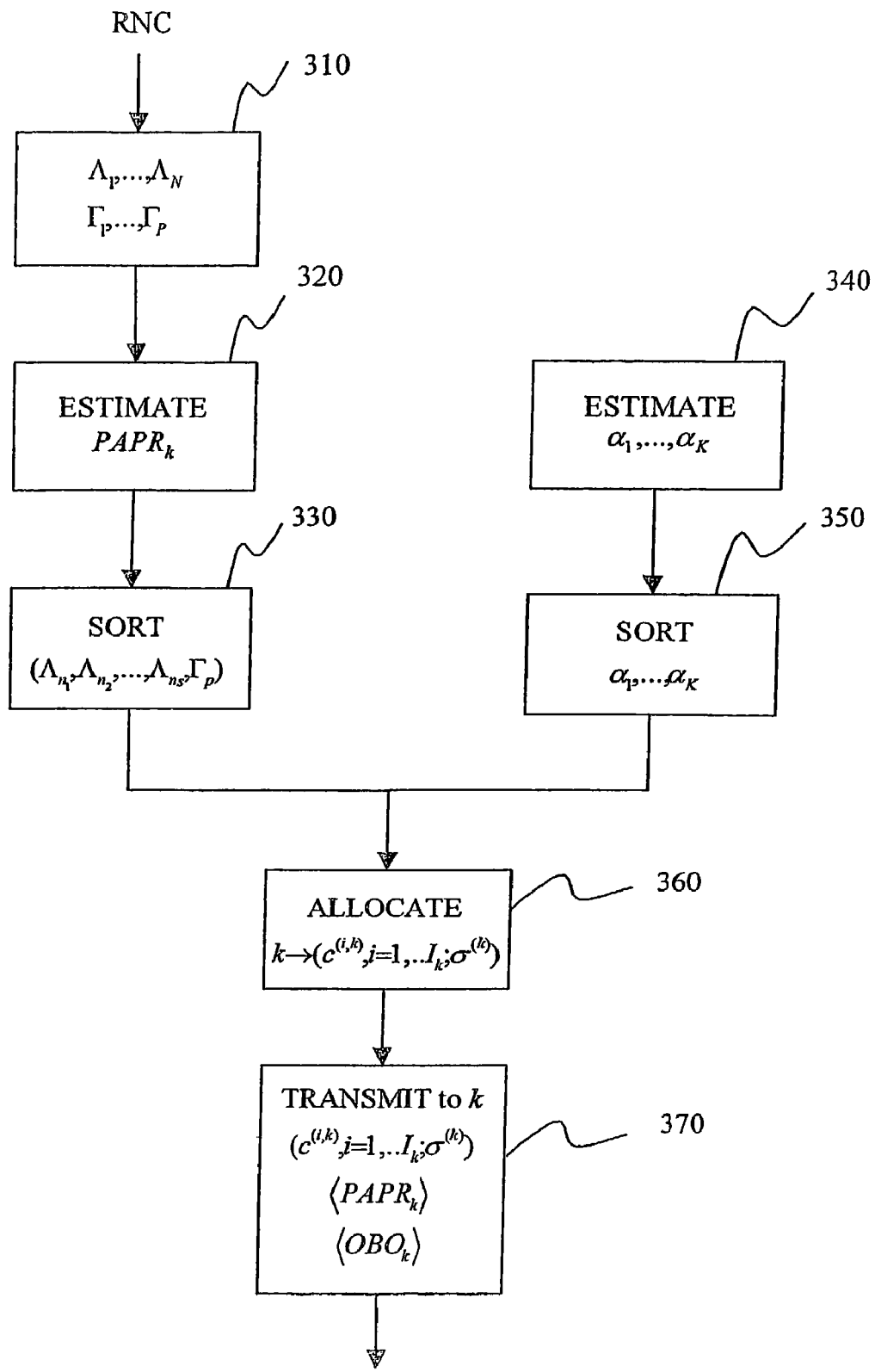
FIG. 3 depicts schematically a flow chart of the code allocation procedure according to an embodiment of the invention.

The procedure for allocating a scrambling code and spreading code(s) to a given user k is illustrated in FIG. 3.

Let us consider a base station to which a set of spreading codes $\{\Lambda_1,\ldots,\Lambda_N\}$ and a set of scrambling codes $\{\Gamma_1,\ldots,\Gamma_P\}$ are allocated (step 310), for example by a RNC (Radio Network Controller).

In step 320, the base station estimates for each combination of spreading codes and scrambling code $(\Lambda_{n_1},\Lambda_{n_2},\ldots,\Lambda_{n_s},\Gamma_p)$ where $\Lambda_{n_i} \in \{\Lambda_1,\ldots,\Lambda_N\}$ and $\Gamma_p \in \{\Gamma_1,\ldots,\Gamma_P\}$ the maximum value of $PAPR(S_k)$, that is:

$$PAPR_k = \underset{S_k}{\text{Max}}[PAPR(S_k)] \quad (6)$$

where the maximum is taken over the sequences of consecutive symbols that can be transmitted by the user.

The combinations $(\Lambda_{n_1},\Lambda_{n_2},\ldots,\Lambda_{n_s},\Lambda_p)$ are then sorted in 330 according to their corresponding $PAPR_k$ values and stored in a look-up table $\Xi$.

Alternatively, according to a preferred embodiment of the invention, the $PAPR_k$ values having been predetermined, the combinations $(\Lambda_{n_1},\Lambda_{n_2},\ldots,\Lambda_{n_s},\Gamma_p)$ are pre-stored in a look-up table according to the ascending or descending $PAPR_k$ order. In such instance, the steps 320 and 330 are simply omitted.

It is assumed that the base station can estimate (340) the path attenuation for each and every active user k, for example, from a power control information transmitted by the mobile terminal. Alternatively, the path attenuation can be derived from the distance of the mobile terminal to the base station. For example, the path attenuation can be expressed in terms of attenuation coefficient $\alpha_k$ or distance value $d_k$.

The base station sorts (step 350) the propagation path attenuation coefficients $\alpha_1,\ldots,\alpha_K$ or the distances relative to the K active users of the cell. Without loss of generality we may suppose that $\alpha_1 \leq \ldots \leq \alpha_k \leq \ldots \leq \alpha_K$. We suppose also that the same number of spreading codes is allocated to the K users, i.e. $I_k=I$, $\forall k$. If this is not the case, the users are sorted and clustered into groups of users requiring the same number of spreading codes and the allocation procedure is carried out for each group independently.

According to a first embodiment of the invention, the allocation procedure allocates to each user k a (I+1)-tuple $(\Lambda_{n_1}, \Lambda_{n_2}, \ldots, \Lambda_{nI_k}, \Gamma_p)$ consisting of I spreading codes and one scrambling code, such that the ordering of the $PAPR_k$ values is as follows:

$$PAPR_K \leq \ldots \leq PAPR_k \leq \ldots \leq PAPR_1 \quad (7)$$

In other words, the codes are allocated so that the more distant users (or the users suffering from a higher propagation loss) benefit from the codes generating lower PAPR values. By so doing, the HPA of a distant mobile terminal can be operated at a lower output back-off value, which in turn allows to reduce the distortion level for a given amplifier efficiency or, conversely, to increase the amplifier efficiency (and hence to lower the power consumption) for a given distortion level. A further advantage of the invention lies also in a larger cell coverage (i.e. a larger cell diameter) since the distance of a mobile terminal to the base station can be increased for a same power consumption and a given distortion level.

The code allocation procedure set out above is carried out at regular time intervals for tracking the changes in the propagation path attenuation coefficients of the different users. However, in order to avoid frequent re-allocation of the codes, it can be decided that no re-allocation is effected if the variations of the propagation path attenuation coefficients lie below a given threshold. The code allocation procedure is also carried out each time a link to be established or released, e.g. during handover.

Preferably, the look-up table $\Xi$ mentioned above is scanned, starting from the (I+1)-tuple of lowest PAPR value and the codes stored therein are allocated to the users starting from the one suffering from the highest propagation loss.

For a given user k, the spreading codes $\Lambda_{n_1}, \Lambda_{n_2}, \ldots, \Lambda_{nI_k}$ and the scrambling code $\Gamma_p$ retrieved from the table are allocated to the user (step 360) as follows:

$$c^{(k,i)} = \Lambda_{n_i} \text{ and } \sigma^{(k)} = \Gamma_p \tag{8}$$

According to a second embodiment of the invention, the range $]0, \alpha_{max}]$ of the attenuation coefficients where $\alpha_{max}$ (or similarly the distance range $]0, R_{max}]$ where $R_{max}$ is the cell radius) is split up into M elementary ranges $]0, \rho_1], ]\rho_1, \rho_2], \ldots, ]\rho_{M-1}, \alpha_{max}]$. Each elementary range $]\rho_{m-1}, \rho_m]$ is attributed a subset $\Xi_m$ of (I+1)-tuples $(\Lambda_{n_1}, \Lambda_{n_2}, \ldots, \Lambda_{nI_k}, \Gamma_p)$ such that the PAPR value resulting from any combination of codes belonging to a subset $\Xi_m$ is lower than the PAPR value generating from any combination of codes belonging to the subset $\Xi_{m-1}$.

For a given user k, the allocation procedure first determines in which elementary range $]\rho_{m-1}, \rho_m]$ the attenuation coefficient falls. An available combination of codes is then looked for in the subset $\Xi_m$. Advantageously, the subset $\Xi_m$ is arranged as a look-up table stored in a memory of the base station. Preferably, the look-up table $\Xi_m$ is scanned, starting from the (I+1)-tuple of lowest PAPR value and the first combination of available of codes is allocated to the user. The (I+1)-tuple is then marked as unavailable in the table until a new allocation makes it available back again.

Here again, the code allocation procedure is carried out at regular time intervals and each time a user requests to establish or release a link. However, in the present embodiment, provided the attenuation coefficient of a user remains in the same elementary range no re-allocation is needed.

According to a first variant, an information indicating the allocated spreading code(s) and scrambling code is sent to the user (step 370). Preferably, the look-up table $\Xi$ (or the set of look-up tables $\Xi_m$) is also stored in a memory of the mobile terminal and the information indicating the allocated codes is an address of said table.

According to a second variant, in addition to the information indicating the allocated codes, the base station transmits to the mobile terminal an information giving the PAPR$_k$ value corresponding to said allocated codes. It should be noted that in place of PAPR$_k$ the Crest Factor $\sqrt{\text{PAPR}_k}$ or, more generally, an information characteristic of the dynamic range of the modulated signal can be transmitted.

According to a third variant, in addition to the information indicating the allocated codes, the base station transmits to the terminal an information giving the optimal output back-off, denoted OBO$_k$, corresponding to said PAPR$_k$ value. In such instance, however, the base station needs to know the characteristics of the HPA of the mobile terminal.

Figure 4:
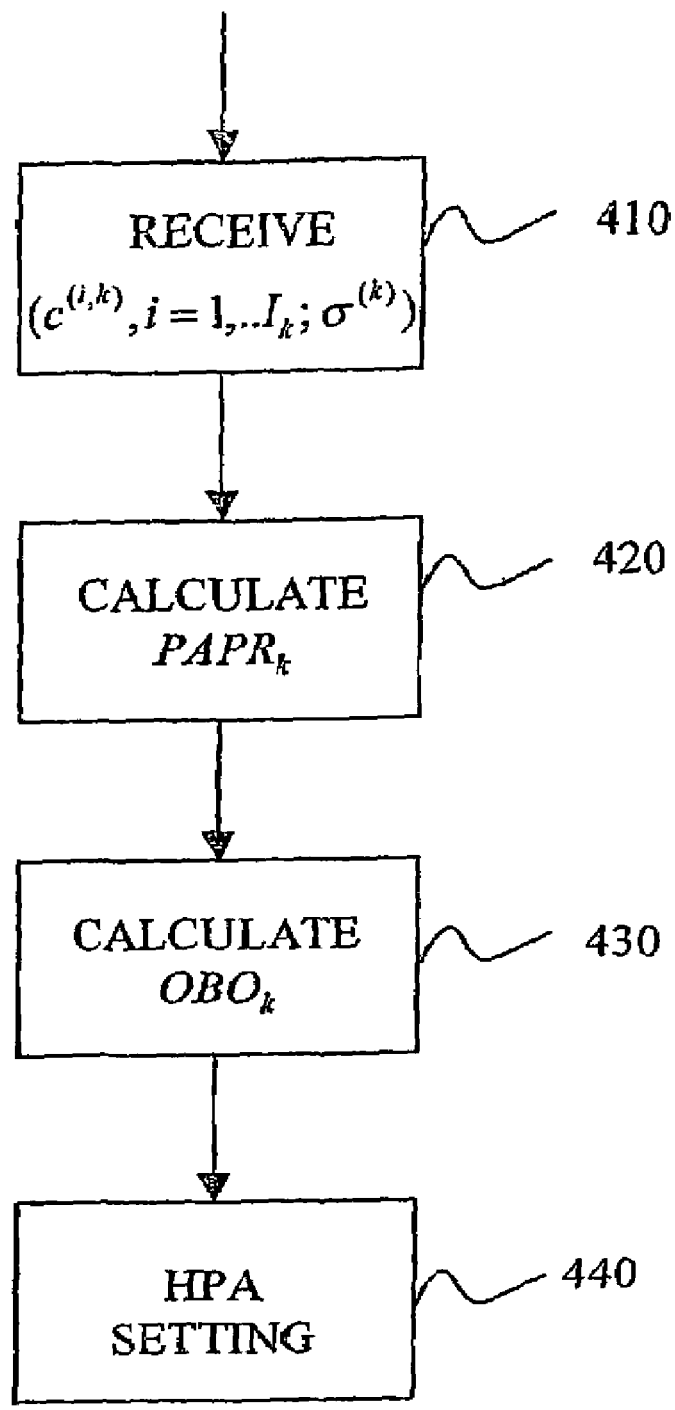
FIG. 4 depicts schematically a method for setting the amplifier of a mobile terminal when a code allocation procedure according to an embodiment of the invention is used.

As shown in FIG. 4, on the mobile terminal side, the information indicating the allocated codes is received in 410. The allocated spreading codes $c^{(i,k)}$ and scrambling code $\sigma^{(k)}$ are retrieved from said information and the corresponding value PAPR$_k$ is calculated in 420. The output back-off value OBO$_k$ is derived therefrom in 430 and the operating point of the amplifier is set accordingly (step 440).

In the second variant of the invention, the calculation step 420 is skipped (since the PAPR$_k$ is sent by the base station to the mobile terminal) and it is directly proceeded with the calculation of OBO$_k$ and the setting of the operating point of the amplifier.

Similarly, in the third variant of the invention, the calculation steps 420 and 430 are skipped and it is directly proceeded with the setting of the operating point of the amplifier. Furthermore, it should be noted that the optimal input back-off value IBO$_k$ of the amplifier and more generally an information representative of the optimal setting of the operating point of the amplifier can be transmitted in place of the optimal output back-off value OBO$_k$.

Although the invention has been essentially described in the foregoing as a code allocation method for an MC-CDMA telecommunication system, it should be clear to the man skilled in the art that it can also be applied to any system combining code multiple access and OFDM modulation.

What is claimed is:

1. Code allocation method for a mobile telecommunication system in which the symbols sent from a user (k) to a base station are spread with a spreading code or a combination of spreading codes ($c^{(k,i)}$) before being modulated with a plurality ($\Omega_{k,i}$) of frequency carriers to produce a modulated signal ($S_k$) transmitted to said base station over a transmission channel, characterised in that for each of a plurality of available spreading codes or available combinations thereof ($\Lambda_{n_1}, \Lambda_{n_2}, \ldots, \Lambda_{nI_k}$) a value of a first variable (PAPR$_k$) characteristic of the dynamic range of said modulated signal ($S_k$) is determined, and that for each of a plurality of users a value of a second variable ($\alpha_k$) characteristic of the propagation loss incurred over the transmission channel of the user is determined, and that a spreading code or combination of spreading codes producing a high dynamic range is allocated to a user if the propagation loss over its transmission channel is low, whereas a spreading code or combination of spreading codes producing a low dynamic range is allocated to said user if the propagation loss over its transmission channel is high.

2. Code allocation method according to claim 1, characterised in that the symbols sent by a user to said base station being multiplied with a scrambling code before being modulated, characterised in that for each of a plurality of available spreading codes or available combinations thereof ($\Lambda_{n_1}, \Lambda_{n_2}, \ldots, \Lambda_{nI_k}$) and each of a plurality of scrambling codes ($\Gamma_p$) a value of a first variable (PAPR$_k$) characteristic of the dynamic range of said modulated signal ($S_k$) is determined, and that for each of a plurality of users a value of a second variable ($\alpha_k$) characteristic of the propagation loss incurred over the transmission channel of the user is determined, and that a scrambling code and a spreading code or combination of spreading codes producing a high dynamic range is allocated to a user if the propagation loss over its transmission channel is low, whereas a scrambling code and a spreading code or combination of spreading codes producing a low dynamic range is allocated to said user if the propagation loss over its transmission channel is high.

3. Code allocation method according to claim 2, characterised in that the values of said first variable for the different spreading codes or combinations of spreading codes and the different scrambling codes, if used, are sorted according to a first order.

4. Code allocation method according to claim 3, characterised in that the users served by said base station are sorted according to a second order, said second order being the same as the order of the respective values of said second variable for said users.

5. Code allocation method according to claim 4, characterised in that, spreading codes/scrambling codes are allocated to said users sorted according to said second order, so that the values of the first variable for said allocated codes are arranged in said first order.

6. Code allocation method according to claim 1, characterised in that the variation range of the second variable is split up into consecutive elementary ranges and that the users are sorted according to a third order, said third order being the same as the order of the elementary ranges in which said values of the second variable respectively fall.

7. Code allocation method according to claim 1, characterised in that said first variable is the maximum of a peak to average ratio of the modulated signal.

8. Code allocation method according to claim 1, characterised in that said second variable is an attenuation coefficient of the transmission channel.

9. Code allocation method according to claim 1, characterised in that said second variable is a location information of the user.

10. Code allocation according to claim 1, characterised in that said base station transmits to said user a first information indicating the code or the codes allocated thereto.

11. Code allocation according to claim 10, characterised in that said base station transmits to said user a second information ($PAPR_k$) giving the value of the first variable for the code or codes allocated to said user.

12. Code allocation according to claim 10, characterised in that said base station derives, from the value of the first variable for the code or codes allocated to said user, a third information representative of a setting of an amplifier for amplifying the modulated signal of said user and transmits said third information to said user.

* * * * *